(12) United States Patent
Kim

(10) Patent No.: US 6,391,491 B1
(45) Date of Patent: May 21, 2002

(54) LITHIUM SECONDARY BATTERY HAVING CASE WITH SIMPLIFIED SAFETY DEVICE

(75) Inventor: Chang-sik Kim, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 22 days.

(21) Appl. No.: 09/655,770

(22) Filed: Sep. 5, 2000

(30) Foreign Application Priority Data

Sep. 8, 1999 (KR) .............................................. 99-38157

(51) Int. Cl.[7] .......................... H01M 2/02; H01M 10/00
(52) U.S. Cl. ....................... 429/178; 429/170; 429/162; 429/127; 429/124; 429/231.95
(58) Field of Search ................. 429/178, 170, 429/162, 127, 124, 231.95

(56) References Cited

U.S. PATENT DOCUMENTS 6,296,967 B1 * 10/2001 Jacobs et al. .................. 429/93

* cited by examiner

*Primary Examiner*—Gabrielle Brouillette
*Assistant Examiner*—Angela J. Martin
(74) *Attorney, Agent, or Firm*—Leydig, Voit & Mayer, Ltd.

(57) ABSTRACT

A lithium secondary battery encased in a pouch and having a simplified and cheap safety device. In the lithium secondary battery, an aluminum terminal is bent and extends to the rear surface of the pouch, and around the front and bottom surfaces. The terminal is positioned at the original location of the aluminum terminal as a positive electrode. The extended terminal has a narrower region in the central portion and is fixed to the pouch using a tape. The narrower portion ruptures if the pouch swells due to increasing internal pressure.

16 Claims, 2 Drawing Sheets

LITHIUM SECONDARY BATTERY HAVING CASE WITH SIMPLIFIED SAFETY DEVICE

BACKGROUND OF THE INVENTION

1. Field of the Invention

The present invention relates to a lithium secondary battery having a pouch as the case thereof, and more particularly, to a secondary battery which has a pouch as a case thereof with a simplified safety device.

2. Description of the Related Art

In general, materials used for secondary batteries, such as positive and negative electrode active materials, a binder, an electrolyte, current collectors and the like, are electrochemically stable at the operating voltage of the batteries, ranging from 2.5 to 4.3 V. However, if the voltage of the battery is raised to over the operational voltage, the respective materials are decomposed at respective decomposition voltages producing gases. The produced gases increase the is internal pressure of the lithium secondary battery.

In the case of a lithium ion secondary battery using a metal can or a plastic as its case, a safety vent is provided for preventing ignition or explosion of the battery due to an increase in the internal pressure. In other words, in the case where gases are produced due to an increase in the internal pressure, that is, exceeding the operational voltage, or short circuiting, the safety vent is ruptured interrupting the flow of current.

Lithium batteries are generally known to be safer than lithium ion batteries. However, the lithium batteries are not still satisfactory in terms of safety. In other words, in the case where the internal pressure of a pouch increases due to gases produced by an increase in voltage exceeding the operational voltage, the pouch which is not so strong as metal, may swell due to an increase in the internal pressure and undergo a continuous increase in voltage. Then, lithium ions accumulate on a negative electrode side and precipitate lithium metal. Here, in the event that there is a minutely shorted portion or the lithium metal penetrates through a separator and comes into contact a positive electrode, a large amount of current flow and generates heat, thereby prompting generation of gases. Thus, a portion of the pouch finally leaks, causing ignition or explosion of the battery. Also, when the positive electrode and the negative electrode are externally shorted, rapid flow of current generates heat and produces gases. Likewise, ignition or explosion the battery occurs.

In order to avoid such adverse effects, in the prior art, over flow of current has been prevented by installing a protective circuit or a PTC (positive temperature coefficient) element, by which current flow is interrupted when the voltage reaches a constant level, during fabrication of unit cells. However, these elements are expensive, which causes an increase in the fabrication cost. Therefore, in a lithium secondary battery with a pouch, there has been increasing demands for low-cost safety devices for interrupting the flow of current when the battery operates abnormally.

SUMMARY OF THE INVENTION

To satisfy the above demands, it is an object of the present invention to provide a cheap and simplified safety device for a lithium secondary battery.

Accordingly, to achieve the above object, there is provided a lithium secondary battery encased in a pouch including a positive electrode terminal and a negative electrode terminal, both of electrodes extending upward with respect to the pouch, one of the electrode terminals having extension which wraps around the pouch, a lead end of the extension forming a new terminal wherein the extension includes a notch where the extension is narrower.

When a battery operates abnormally, that is, when a battery operates with a voltage higher than the operational voltage thereof or when a positive electrode and a negative electrode are shorted, gases are produced and the pouch swells accordingly. Then, the extended terminal which wraps around the pouch also swells. Due to swelling of the terminal, a stress is intensively applied to a notch of the terminal. As a result, excessive swelling of the pouch cuts the notch. Thus, the flow of current is interrupted to inhibit further reaction.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

A preferred embodiment of the present invention will now be described in detail with reference to the accompanying drawings.

Figure 1:
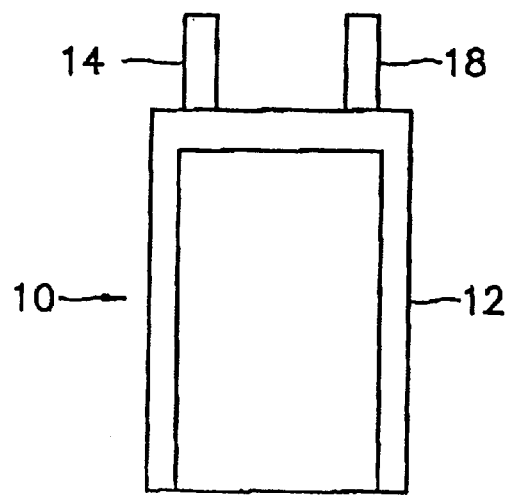
FIG. 1 is a front view of a conventional lithium secondary battery encased in a pouch.

FIG. 1 shows a conventional lithium secondary battery 10 encased in a pouch, in which gases produced during formation are removed by a degassing process. As shown in FIG. 1, the battery 10 includes a pouch 12 as a case thereof, and a positive electrode terminal 14 and a negative electrode terminal 18, extending outward with respect to the pouch 12.

Figure 2:
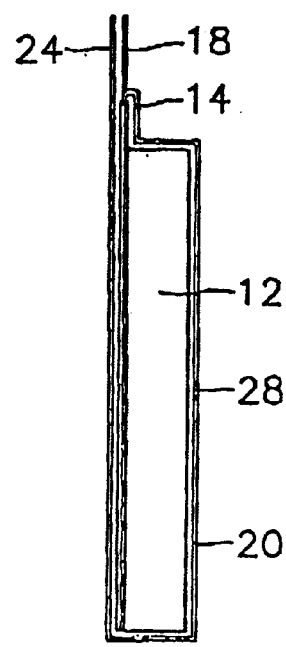
FIG. 2 is a side view of a lithium secondary battery of the present invention.
Figure 3:
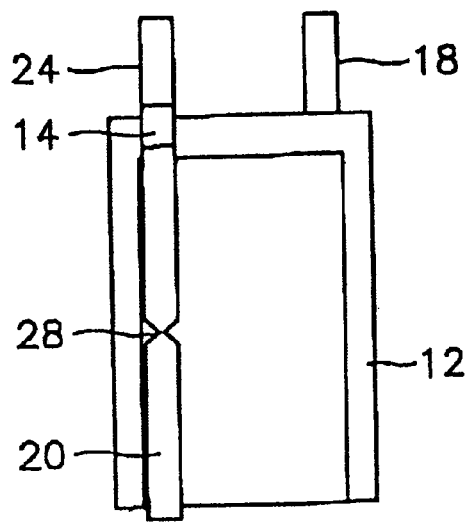
FIG. 3 is a front view of the lithium secondary battery shown in FIG. 2.

Here, the present invention provides that either the positive electrode terminal 14 or the negative electrode terminal 18 is extended to wrap around the pouch 12, and FIG. 2 is a side view of such a lithium secondary battery. As shown, a positive aluminum terminal 14 is bent and extended to the rear surface of the pouch 12 via the front and bottom surfaces of the pouch 12. Reference numeral 20 denotes the thus extended terminal. The terminal 20 closely contacts the pouch 12 and extends to the rear surface of the pouch 12 form the front surface of the pouch 12 and the lead end 24 of the terminal 20 is positioned at the original location of the aluminum terminal 14 as a positive electrode. The extended terminal 20 has a notch 28 in the central portion thereof. FIG. 3 is a front view of the lithium secondary battery shown in FIG. 2, and shows the notch 28.

It can be appreciated that, from FIGS. 2 and 3, the original terminal 14 is extended and wraps arounds the pouch 12, the extended portion 20 being attached to the pouch 12 and including the notch 28, and the lead end of the extended portion 20 forming a new positive electrode.

The extending portion 20 can be formed by connecting the original terminal 14 with another terminal of the same material. In this embodiment of FIGS. 2 and 3, the separate extending terminal 20 is connected to the original terminal 14 by welding. However, it is possible that the original terminal is long enough to wrap around the outer surface of a pouch, so that the original terminal is extended to wrap around the pouch.

It is preferable that the original terminal 14 and the extended terminal 20 stably contact and are fixed to the pouch 12.

Figure 4:
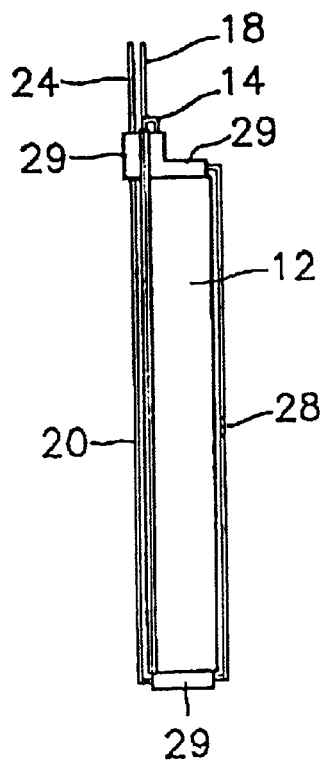
FIG. 4 is a side view illustrating an extending terminal fixed to a pouch using a tape.

FIG. 4 shows that the original terminal 14 and the extended terminal 20 are fixed to the pouch 12 at three points by means of a tape 29.

When a battery operates abnormally, that is, when a battery operates with a voltage higher than the operational voltage thereof or when a positive electrode and a negative electrode are shorted, gases are produced and the pouch swells due to an increase in the internal pressure. Then, the extended terminal 20 which wraps around the pouch 12 also expands. Due to expansion of the extended terminal 20, a stress is intensively applied to the notch 28 of the terminal 20. As a result the extended terminal 20 is ruptured at the notch 28. Thus, the flow of current is interrupted to inhibit further reaction.

The pouch 12 generally swells from a time when the voltage becomes 4.5 V or higher, due to production of gases. Here, it is preferable to form the notch 28 to be cut when the pouch reaches 10% volume swelling.

In this embodiment, the terminal 14 is made of aluminum for use in a positive electrode terminal because aluminum is easily ruptured due to its low ductility, but the terminal is not limited to aluminum. Nickel or copper may be used as the material of the positive electrode terminal. This is also true of a negative electrode terminal. That is to say, the terminal 14 may be a negative electrode terminal made of copper. Also, the terminal 14 may be either a positive electrode or a negative electrode terminal, made of nickel. The thickness of the notch 28 is preferably 0.01 to 0.9 times that of the terminal 14. Also, the extended terminal 20 may be fixed to the pouch 12 by an adhesive agent.

As described above, according to the present invention, the safety device for a lithium secondary battery with a pouch can be attained with a simplified structure at low cost, without an expensive protective circuit or PTC (positive temperature coefficient) element. Further, since installing the protective circuit or PTC element is not necessary, the lithium secondary battery can be manufactured fast.

What is claimed is:

1. A lithium secondary battery comprising:

a pouch; and a positive electrode terminal and a negative electrode terminal extending outward with respect to the pouch, one of the positive and negative electrode terminals having an extension wrapping around the pouch and having a lead end of the extension as a terminal, wherein the extension includes a notch where the extension is narrower than elsewhere.

2. The lithium secondary battery according to claim 1, wherein the terminal having an extension is a positive electrode terminal made of aluminum.

3. The lithium secondary battery according to claim 1, wherein the terminal having an extension is a negative electrode terminal made of copper.

4. The lithium secondary battery according to claim 1, wherein the extension of the terminal is connected to the terminal with the same material as the terminal.

5. The lithium secondary battery according to claim 1, wherein the notch has a width 0.01 to 0.9 times that of the extension.

6. The lithium secondary battery according to claim 2, wherein the notch has a width 0.01 to 0.9 times that of the extension.

7. The lithium secondary battery according to claim 3, wherein the notch has a width 0.01 to 0.9 times that of the extension.

8. The lithium secondary battery according to claim 4, wherein the notch has a width 0.01 to 0.9 times that of the extension.

9. The lithium secondary battery according to claim 1, wherein the extension is fixed to the pouch by one of tape and an adhesive agent.

10. The lithium secondary battery according to claim 2, wherein the extension is fixed to the pouch by one of tape and an adhesive agent.

11. The lithium secondary battery according to claim 3, wherein the extension is fixed to the pouch by one of tape and an adhesive agent.

12. The lithium secondary battery according to claim 4, wherein the extension is fixed to the pouch by one of tape and an adhesive agent.

13. The lithium secondary battery according to claim 5, wherein the extension is fixed to the pouch by one of tape and an adhesive agent.

14. The lithium secondary battery according to claim 6, wherein the extension is fixed to the pouch by one of tape and an adhesive agent.

15. The lithium secondary battery according to claim 7, wherein the extension is fixed to the pouch by one of tape and an adhesive agent.

16. The lithium secondary battery according to claim 8, wherein the extension is fixed to the pouch by one of tape and an adhesive agent.

* * * * *